July 7, 1953            T. BROWN            2,644,385
REVERSING AND LEVELING MEANS FOR TWO-WAY PLOWS
Filed July 26, 1950
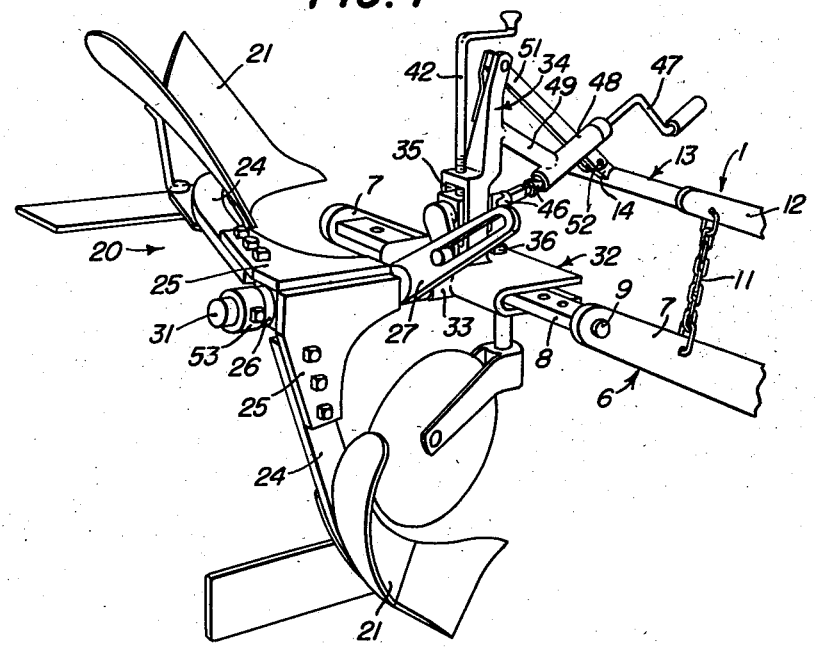
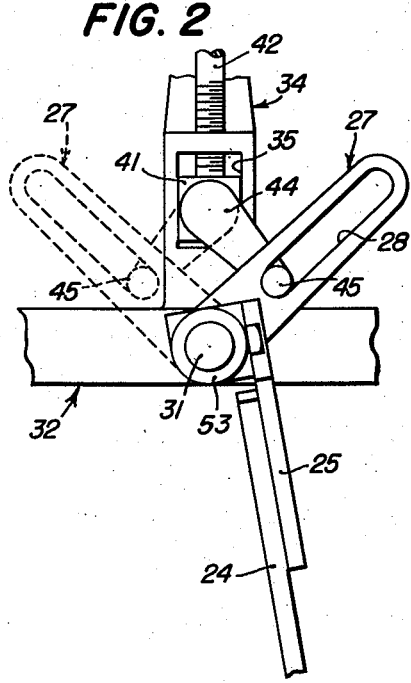
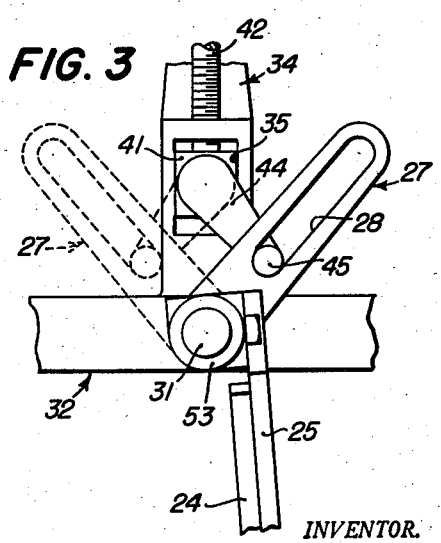
INVENTOR.
THEOPHILUS BROWN
BY
ATTORNEYS Patented July 7, 1953

2,644,385

UNITED STATES PATENT OFFICE 2,644,385

REVERSING AND LEVELING MEANS FOR TWO-WAY PLOWS

Theophilus Brown, Moline, Ill., assignor to Deere & Company, Moline, Ill., a corporation of Illinois Application July 26, 1950, Serial No. 175,953

11 Claims. (Cl. 97—26)

The present invention relates generally to agricultural machines and more particularly to ground-working implements such as two-way plows.

The object and general nature of the present invention is the provision of a two-way plow of the tractor-carried type having a combined reversing and leveling adjustment. More particularly, it is an important feature of this invention to provide reversing mechanism, with means acting therethrough for adjusting the plows so as to operate properly at different depths of operation, as desired.

Further, an important feature of this invention is the provision of a tractor-carried two-way plow having a plow beam swingable about a longitudinal axis and carrying a slotted arm in which a generally centrally mounted crank operates for shifting the plow beam from one position to another according to whether it is desired to operate with the right-hand or the left-hand plow means, and more specifically it is a feature of this invention to provide means for raising and lowering the crank relative to the plow beam and the slotted arm for the purpose of adjusting the plow means to different depths of operation.

These and other objects and advantages of the present invention will be apparent to those skilled in the art after a consideration of the following detailed description of the presently preferred embodiment, taken in conjunction with the accompanying drawings in which said embodiment has been illustrated.

In the drawings:

Figure 1 is a perspective view of a two-way plow in which the principles of the present invention have been incorporated and a rear portion of a tractor on which the plow of the present invention has been mounted, the plow being shown in the raised position.

Figures 2 and 3 are fragmentary rear views showing the action of the adjusting means of the present invention for leveling the plow at different depths of operation.

Referring now to the drawings, particularly Figure 1, the reference numeral 1 indicates the draft linkage carried at the rear end of a farm tractor, of conventional construction so far as the present invention is concerned, having a rear axle structure which includes laterally outwardly extending axle shafts on which rear drive wheels are fixed. The draft linkage 1 includes a rearwardly extending, generally U-shaped drawbar 6 that is provided with side members 7 and a rear transversely extending member 8 pivoted at its ends, as at 9, to the rear end portions of the side members 7. The drawbar 6 is raised and lowered by means of link means 11 which depend from a pair of arms 12 fixed to a power-operated rockshaft 13 to the central portion of which a generally rearwardly extending control arm 14 is fixed. The rockshaft 13 is supported for rocking movement on the rear portion of the tractor in any suitable way and is operated by power derived from the tractor motor, as by a hydraulic system that is conventional so far as the present invention is concerned.

The implement in which the principles of the present invention are incorporated comprises a two-way plow indicated in its entirety by the reference numeral 20. Each of the plowing units includes a plow bottom 21 fixed to the lower end of a standard 24, the upper end of each standard being connected by a bracket plate 25 to a generally fore and aft extending rockable sleeve member 26. At its forward end the sleeve 26 carries an arm 27 having an elongated slot 28, and the sleeve member 26 is mounted for rocking movement on a rearwardly directed shaft support 31 that is fixed at its forward end to the lower portion of an attaching member that is indicated in its entirety by the reference numeral 32. The latter member includes a socket section 33 at its lower end, to which the forward end of the shaft member 31 is fixed, and a vertically extending section 34 that is provided with a slot 35 just above the socket section 33. The latter section is shaped to snugly embrace the transverse member 8 of the tractor drawbar 6, and the attaching member 32 is suitably connected in draft-transmitting relation to the transverse bar 8 of the drawbar so that the plow may pivot with respect to the tractor drawbar. Preferably, a hitch pin 36 or the like is utilized for this purpose, and the socket member 32 is so formed as to have the clearance necessary to accommodate lateral pivoting of the member 32 relative to the transverse member 8 of the drawbar. The sleeve member 26, in effect, constitutes a plow beam which is rockably mounted to swing from one side to the other so as to bring one or the other of the plow bottoms 23 into plowing position.

According to the principles of the present invention, I provide reversing and leveling mechanism which will provide an easy and convenient means for controlling the plow. Such mechanism will now be described. Disposed for vertical adjustment in the slot 35 is an apertured block 41 which is connected to the lower end of a crank screw 42 that is threaded into a portion of the attachment section 34 just above the slot 35, whereby turning the crank screw 42 in one direction or the other serves to raise and lower the block 41. Rockably mounted in the aperture of said block 41 is a crank member 44 having a pin 45 disposed in the slot 28 of the plow beam arm 27. The forward end of the crank member 44, in front of the block 41, is provided with a pair of universal joints indicated at 46, by which a hand crank 47 is connected to turn the crank arm 44. The hand crank 47 is carried in a sleeve-like portion 48 that forms the forward part of a laterally and forwardly extending portion 49 of the attachment member 32. The upper end of the latter member is pivotally connected to a link member 51 which at its forward end is connected, as at 52, to the control arm 14 of the power operated rockshaft 13 on the tractor. A set screw collar 53 or other suitable means is disposed at the rear end of the sleeve 26 and is fixedly connected to the rear end of the supporting shaft 31, whereby the draft of the plow is transmitted through the collar 53 to the supporting shaft 31.

The operation of the plow described above is substantially as follows:

The plow 20 is raised and lowered into and out of transport position by vertical swinging of the tractor drawbar 6 which, as described above, is actuated through linkages 11 by the arms 12 on the power-operated rockshaft 13 of the tractor. When the plow 20 is raised one or the other of the plow bottoms 23 may be swung into operating position by turning the hand crank 47, which rocks the crank member 44 from one side to the other as indicated in Figures 2 and 3, and the arm 44 acts through the arm 27 to swing the desired plow bottom into operating position. In either position, the bottoming of the pin 45 in the slot 28 determines the end of the crank throw. It will be noted that when either plow is swung into operating position the crank arm 44 moves substantially into perpendicular relation with respect to the plow beam arm 27, whereby the plow is held in working position by the crank arm 44 without any latches, locking mechanisms or the like. After the right-hand, or the lefthand, plow bottom has been swung into a position for plowing, by manipulating the hand crank 47 as described above, plowing may be commenced merely by operating the power lift mechanism of the tractor to lower the tractor drawbar 6. It will be noted from Figure 1 that the upper link 51 is approximately parallel to the drawbar 6, whereby each plow bottom is thereby held in the desired fore and aft leveled position by the aforesaid link connection with the tractor.

Normally, in outfits of this type, when plowing the tractor is operated with one rear drive wheel in the previously opened furrow. This results in a tilted position of the tractor relative to the ground surface and therefore in order to maintain the plow bottom in operating position laterally level at different depths of operation, in which the plow will be tilted various amounts depending upon changes in the depth of operation, it is necessary to provide means for changing the lateral tilt of the plow bottom relative to the tractor when changing the depth of operation of the plow, since the attachment member 32 is connected with the drawbar 6 of the tractor in such a manner as to tilt laterally therewith. To this end, and according to the principles of the present invention, I provide the vertically adjustable block 41 and the leveling crank screw 42 for the purpose of raising and lowering the crank arm 44 so as to cause slight changes in the position of the plow beam arm 27 for the purpose of changing the angle of the plow bottom in operating position relative to the tractor in its tilted position, the amount of tilt varying, as mentioned above, with changes in the depth of operation. The action of the parts in effecting a lateral leveling of the plow bottom in operating position is illustrated in Figures 2 and 3, from which it will be noted that by turning the crank screw 42 in one direction or the other serves to raise and lower the crank arm 44 bodily relative to the plow beam, and this swings the plow beam arm 27 through an angle that, although relatively small, is sufficient to bring the plow bottom into a laterally level position. The change in the angular relationship between the crank arm 44 and the plow beam arm 27 is relatively small so that the crank arm 44 remains sufficiently close to a perpendicular relation with respect to the slot in the arm 27, whereby the plow beam is locked in operating position although tilted to various degrees, according to the depth of plowing desired.

Normally, the links 11 are slack in plowing, whereby the tractor drawbar 6 is free to swing vertically as is also the upper link 51. While approximately parallel, actually the link 51 and drawbar 6 converge at a virtual hitch point which lies well forward of the rear end of the tractor so that, so long as the links 11 are slack, the plow in operating position swings generally vertically about the aforesaid virtual hitch point. During all times that the links 11 are slack, the depth of plowing may be varied by operating the tractor power lift which, causing a rocking movement of the rockshaft 13, acts through the control arm 14 and the upper link 51 to increase or decrease the depth of plowing. If necessary, the leveling crank screw 42 may be adjusted to bring the plow in operating position back to a laterally level relation with respect to the surface of the ground, although this is not always necessary where only minor changes in the depth of plowing are made. After the rockshaft 13 has been operated to take out the slack of the links 11, the drawbar 6 of the tractor is then raised, which accomplishes the raising of the plow into a transport position.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. A two-way plow comprising a plow-carrying beam structure rockable about a generally fore and aft extending axis, means for raising and lowering said beam structure for raising and lowering said plows into and out of operation, means for swinging said beam about said axis for reversing said plows, said swinging means being movable relative to said beam for varying the amount of movement of said beam for a given operation of said swinging means, and means for shifting said swinging means relative to said beam for positioning the plow in operating position to accommodate different depths of plowing.

2. A two-way plow adapted for use with a tractor having laterally spaced apart ground-engaging means, one of which is adapted to operate in a previously opened furrow, said plow comprising a frame member attachable to the tractor so as to tilt laterally therewith, a plow-carrying plow beam connected with said frame member to rock relative thereto about a generally longitudinally extending axis, means shiftable generally laterally relative to said frame member and connected with said plow beam to rock the latter about said axis to swing one or the other of said plows between transport and plowing position, and means for adjusting said shiftable means vertically relative to said plow beam for adjusting said plows to compensate for variations in the amount of tilt of the tractor at different depths of operation.

3. A two-way plow comprising a frame member adapted to be attached to a tractor or the like, a rearwardly extending plow beam rockably mounted at its forward end in said frame member and carrying right and left hand plow bottoms, said frame member having a generally vertically extending slot, an apertured part slidably disposed in said slot, a crank member rockably mounted in the aperture of said part and connected to rock said plow beam from one position to another, and means for raising and lowering said part in said slot.

4. A two-way plow comprising frame means, a plow beam carrying right and left hand plow bottoms journaled for rocking movement in said frame means so as to bring one or the other of said plow bottoms into plowing position, a part shiftably and rockably mounted in said frame, means connecting said part with said beam whereby rocking movement of said part rocks said beam, and means for shifting said part generally vertically to vary the position of said beam to accommodate changes in the depth of plowing of either plow bottom.

5. A two-way plow adapted to be connected to a tractor having a generally vertically swingable drawbar and means for raising and lowering the drawbar, said two-way plow comprising a vertically disposable attachment member having means at its lower portion to receive said drawbar in draft-transmitting relation, a rearwardly extending beam rockably mounted at its forward end in said attachment member for movement relative thereto about a generally fore and aft extending axis, a pair of right and left hand plows carried by said beam, a slotted arm fixed to said beam adjacent said member, an operating arm rockably mounted in said member having a crank pin disposed in the slot in said first arm, whereby rocking said operating arm relative to said attachment member serves to swing said plow beam from one position to another.

6. A two-way plow as defined in claim 5, further characterized by said operating arm movable substantially into a position normal to said slot in the beam arm, whereby said beam is held in proper operating position in either position of the beam relative to the attachment frame.

7. A two-way plow as defined in claim 5, further characterized by means for rocking said operating arm to reverse said plows, and means for raising and lowering said operating arm to adjust said plows to accommodate changes in the depth of operation.

8. A two-way plow adapted to be connected to a tractor having a generally vertically shiftable drawbar, power means connected therewith for operating the drawbar to raise and lower the same, and an operating part movable concomitantly with said power-operated means, said plow comprising an attachment member adapted to be connected at its lower portion with said tractor drawbar to pivot relative thereto about a generally vertical axis, a generally fore and aft extending plow beam swingably connected at its forward end with said attachment member, means carried by the latter member for swinging said plow beam from one position to another, and means adapted to connect the upper end of said attachment member with said concomitantly operated part, and right- and left-hand plow means carried by said beam.

9. The invention set forth in claim 8, further characterized by said attachment member being adapted to tilt laterally with the tractor, and means connected with said plow beam rocking means for raising and lowering the latter for varying the position of the plow means in plowing position to compensate for variations in the amount of tilt of the tractor at different depths of operation.

10. The invention set forth in claim 8, further characterized by said plow beam rocking means comprising a crank member rockably mounted on said attachment member and operatively connected with said plow beam for swinging the latter from one side to the other when said crank member is swung from one side to the other of said attachment member.

11. The invention set forth in claim 8, further characterized by said plow beam rocking means comprising a crank member rockably mounted on said attachment member and operatively connected with said plow beam for swinging the latter from one side to the other when said crank member is swung from one side to the other of said attachment, and means for raising and lowering said crank relative to said attachment member and said beam for varying the position of the plow means in plowing position so as to accommodate different depths of operation.

THEOPHILUS BROWN.

References Cited in the file of this patent

UNITED STATES PATENTS

| Number | Name | Date |
|---|---|---|
| 219,220 | Chapman | Sept. 2, 1879 |
| 1,191,143 | Amiot | July 18, 1916 |
| 2,227,366 | Pridgen | Dec. 31, 1940 |

FOREIGN PATENTS

| Number | Country | Date |
|---|---|---|
| 519,437 | France | Jan. 24, 1921 |
| 541,378 | France | May 2, 1922 |
| 456,670 | Great Britain | Nov. 13, 1936 |